United States Patent [19]
Otto

[11] 3,867,654
[45] Feb. 18, 1975

[54] DYNAMOELECTRIC MACHINE STATOR
[75] Inventor: Charles W. Otto, De Kalb, Ill.
[73] Assignee: General Electric Company, Fort Wayne, Ind.
[22] Filed: Sept. 24, 1973
[21] Appl. No.: 400,050

Related U.S. Application Data
[63] Continuation-in-part of Ser. No. 246,315, April 21, 1973, abandoned.

[52] U.S. Cl................ 310/42, 310/254, 310/258
[51] Int. Cl............................................. H02k 1/12
[58] Field of Search .......... 310/254, 258, 154, 214, 310/42

[56] References Cited
UNITED STATES PATENTS
| | | | |
|---|---|---|---|
| 2,939,021 | 5/1960 | Gilchrist | 310/258 X |
| 3,009,073 | 11/1961 | Drabik et al. | 310/214 |
| 3,145,313 | 8/1964 | Tupper | 310/258 X |
| 3,313,967 | 4/1967 | Ross | 310/258 X |

Primary Examiner—J. D. Miller
Assistant Examiner—Robert J. Hickey
Attorney, Agent, or Firm—Joseph E. Papin

[57] ABSTRACT

A stator for a dynamoelectric machine having at least one end frame is provided with a stack of laminations having opposite end faces, and a plurality of openings are disposed in the stack between the end faces thereof. Means in the openings holds the laminations generally against displacement from their stacked positions. Means is mounted in the openings for supporting engagement with the one end frame and includes means urged into engagement with the stack within the opening for preventing displacement of the supporting means generally radially of the openings and other means respectively engaged with at least a portion of the opposite end faces about the openings for preventing displacement of the suporting means generally axially of the openings.

There is also disclosed a stationary member for a dynamoelectric machine having at least one end frame, and the stationary member has a peripheral portion connected between opposite end faces. A plurality of openings are provided in the stationary member between the end faces thereof and intersecting the peripheral portion. Means is mounted in the openings for supporting engagement with the one end frame and includes means respectively engaged with the opposite end faces adjacent the openings for preventing displacement of the supporting means generally axially thereof and other means engaged with the stationary member within the opening for preventing displacement of the supporting means generally radially thereof.

23 Claims, 11 Drawing Figures

3,867,654

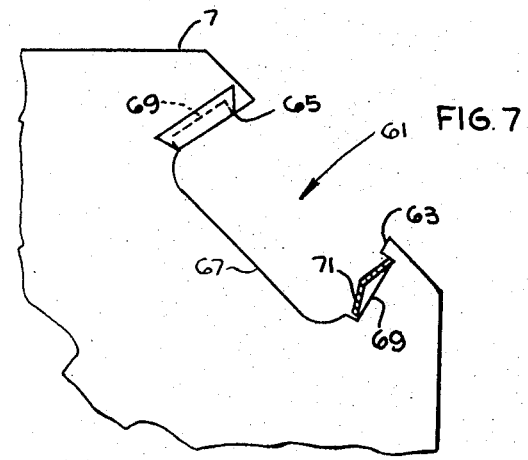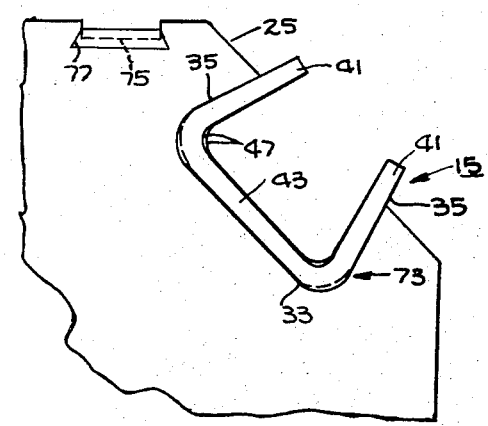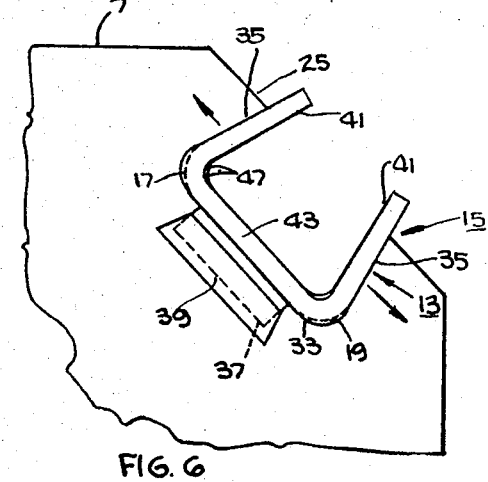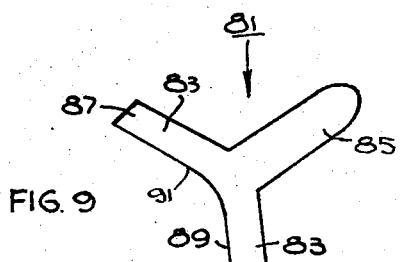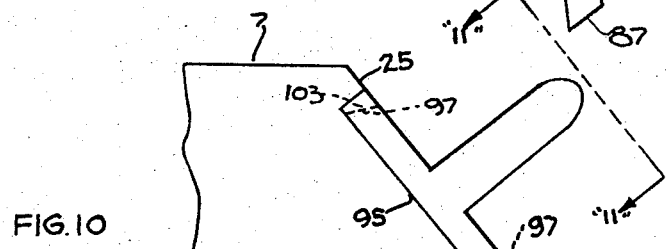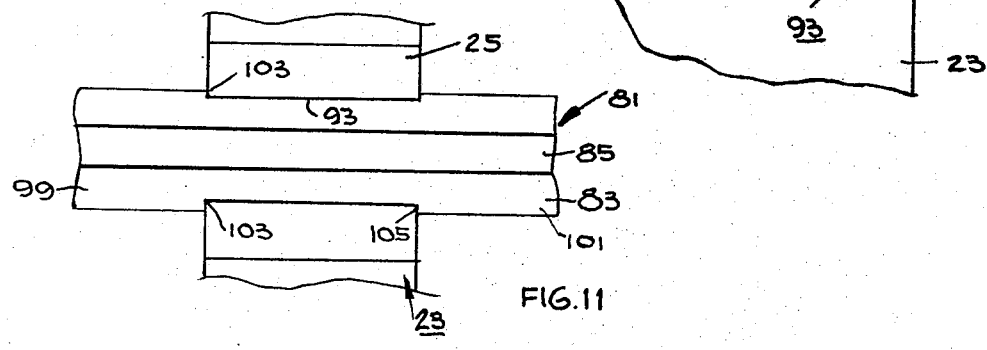

DYNAMOELECTRIC MACHINE STATOR

CROSS-REFERENCE TO RELATED PATENTS

This application for patent is a continuation-in-part of copending application Ser. No. 246,315 filed Apr. 21, 1972, now abandoned which is specifically incorporated by reference herein in its entirety.

FIELD OF THE INVENTION

This invention relates generally to dynamoelectric machine and in particular to stationary members thereof.

BACKGROUND OF THE INVENTION

As is well-known in the art, dynamoelectric machines are, in general, provided with a stationary member, such as a stator, and a rotatable member, such as a rotor which is rotatably received in the stator. Typically the dynamoelectric machine is also provided with opposite end frames secured to the stator adjacent opposite end faces thereof, and the rotatable member is journaled or rotatably supported in the opposite end frames.

In dynamoelectric machines of the type just described, it is most important that the rotor and stator thereof be assembled during manufacture in proper radial and axial alignment, since improper radial alignment results in undesirable eccentricity in an annular air gap between the rotor and stator while improper axial alignment produces undesirable excessive axial rotor thrust.

It is also important that bearing means carried by the opposite end frames be mutually aligned for longevity purposes.

In the past, various stator constructions have been provided in dynamoelectric machines for supporting engagement with opposite end frames. For example, stators have been connected to end frames by through-bolts; however, proper radial alignment here is achieved principally through close tolerance fits between the dynamoelectric machine components. Of course, the tighter tolerances are held, the more accurate the resulting alignment; however, one of the disadvantageous features of such construction is that close tolerances not only are costly to effect during manufacture but also impede assembly.

In another stator construction, an oversized dummy rotor was employed to effect proper alignment of the stator with an end frame, and after through-bolts were tightened to maintain the rotor and end frames in their aligned position, an actual rotor was substituted for the dummy rotor. Such use of dummy rotors, however, has been limited to "unit bearing" type machines, that is to say dynamoelectric machines in which the rotor is supported at one end only. A disadvantageous feature of this type of stator construction and method of aligning it was that it was unavailable for use with the great majority of dynamoelectric machines wherein the rotor is rotatably supported at both ends of its shaft in opposite end frames.

U.S. Pat. No. 3,165,816 discloses a stator construction which is connected to its end frames by adhesive bonding material, such as a thermosetting resin or the like; however, while this stator construction may have provided satisfactory attachment to the end frame, one of the disadvantageous features thereof was that the problems generally associated with the use of adhesives were, of course, present.

U.S. Pat. No. 3,705,994 discloses a stator construction having a set of beams welded thereto and also welded to end plates of the dynamoelectric machine; however, one of the undesirable features thereof is that the welds establish stresses upon cooling which tend to distort the preferred alignments of the dynamoelectric machine components, as is well known in the art.

A principle object of the present invention is to provide a stator for supporting engagement with an end frame of a dynamoelectric machine which overcomes the disadvantageous or undesirable features set forth hereinabove with respect to the past stators, and this, as well as other objects and advantageous features of the present invention, will in part be apparent and in part be pointed out in the specification which follows.

SUMMARY OF THE INVENTION

In general, a stator of this invention for a dynamoelectric machine having at least one end frame comprises a stack of laminations having opposite end faces, and a plurality of openings are disposed in the stack between the opposite end faces thereof. Means is disposed in at least some of the openings for holding the laminations generally in their stacked positions. Means is mounted in the openings for supporting engagement with the end frame and includes means urged into engagement with the stack within the opening and preventing displacement of the supporting means generally radially of the openings and other means respectively engaged with at least a portion of the opposite end faces about the openings for preventing displacement of the supporting means generally axially of the openings.

Further and in general, a stationary member of this invention for a dynamoelectric machine having at least one end frame comprise a peripheral portion connected between opposite end faces, and a plurality of openings in the stationary member between the end face thereof and intersecting the peripheral portion. Means is mounted in the openings for supporting the one end frame and includes means respectively engaged with the opposite faces adjacent the openings for preventing displacement of the supporting means generally axially thereof and other means engaged with the stationary member within the openings preventing displacement of the supporting means generally radially thereof.

BRIEF DESCRIPTION OF THE DRAWING

FIG. 6 is a fragmentary end elevational view showing the beams of the stationary member assembled in the respective groove means thereof;

FIG. 7 is a fragmentary end elevational view of another stationary member of this invention illustrating an alternative construction for positioning the holding means;

FIG. 8 is a fragmentary end elevational view of still another stationary member of this invention illustrating an alternative construction for positioning the supporting means and holding means;

FIG. 9 is an end elevational view of another supporting means;

FIG. 10 is a fragmentary end elevational of another stationary member of this invention showing the supporting means of FIG. 9 mounted thereto; and FIG. 11 is a fragmentary view taken along line 11—11 of FIG. 10.

Corresponding reference characters indicate corresponding parts throughout the several views of the drawings.

The following examples illustrate the invention and are not to be construed as limiting in any manner.

DETAILED DESCRIPTION OF THE PREFERRED EMBODIMENT

Figure 1:
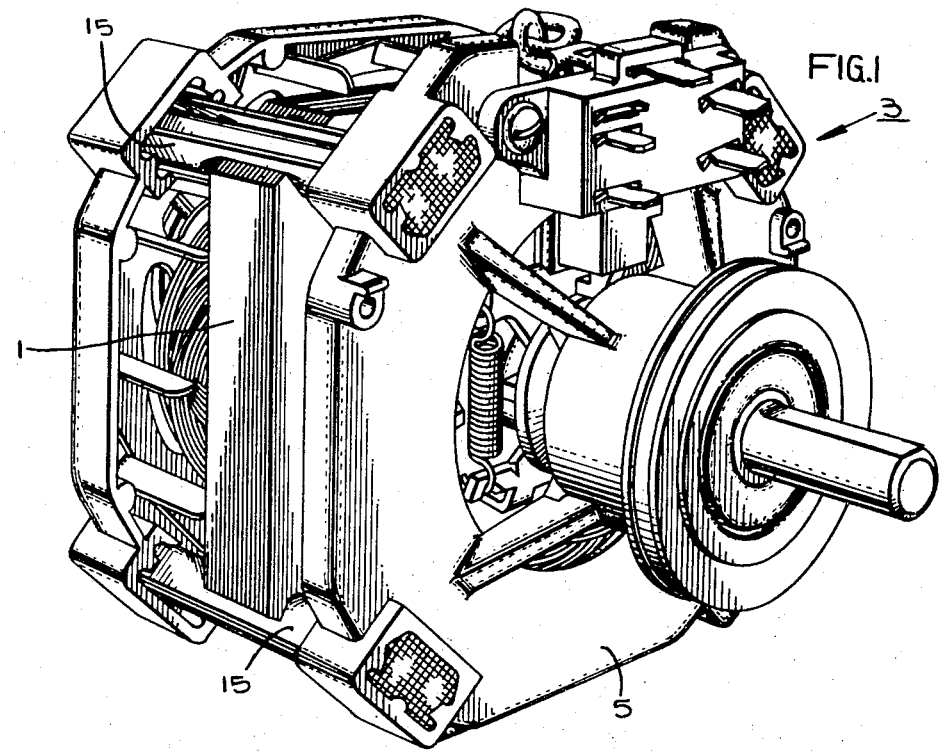
FIG. 1 is a perspective view of a dynamoelectric machine having a stationary member of this invention therein.
Figure 2:
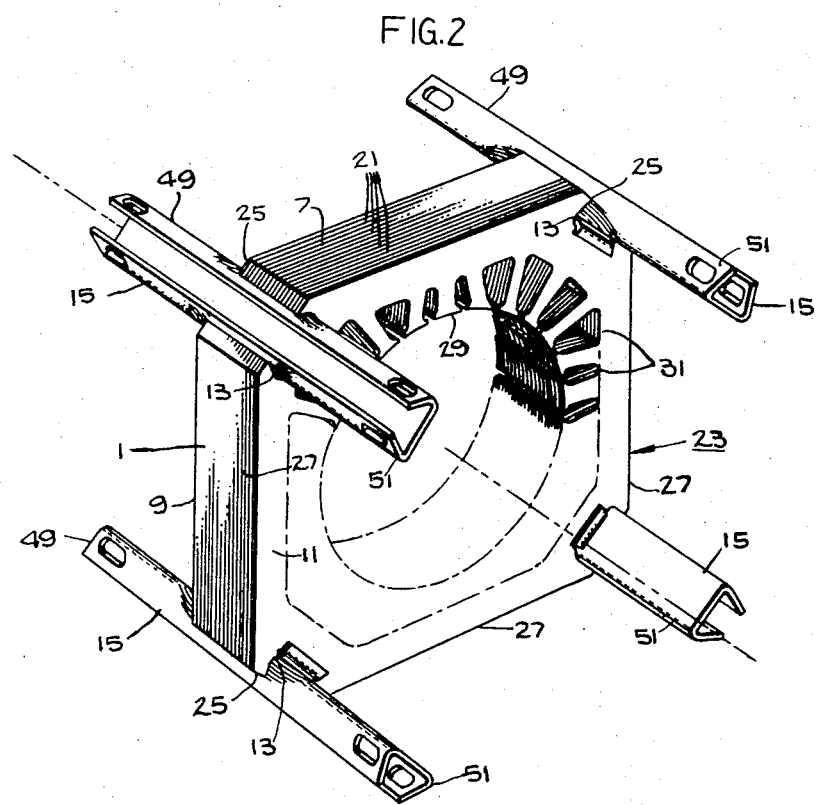
FIG. 2 is a perspective view of the stationary member of the dynamoelectric machine shown in FIG. 1.
Figure 3:
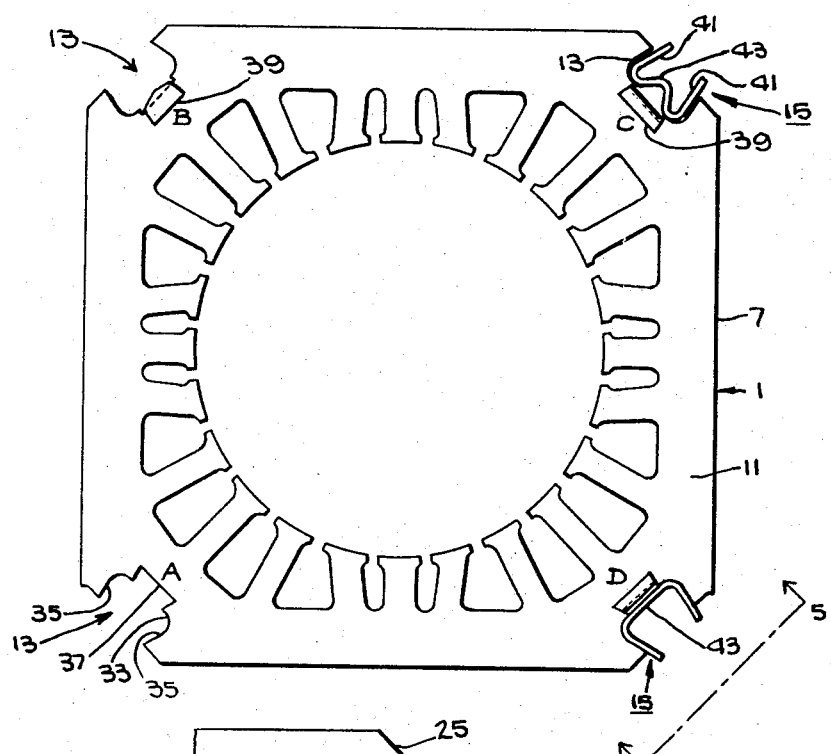
FIG. 3 is a side elevational view of the stationary member shown in FIG. 2, portions of which are shown in various stages of assembly.
Figure 4:
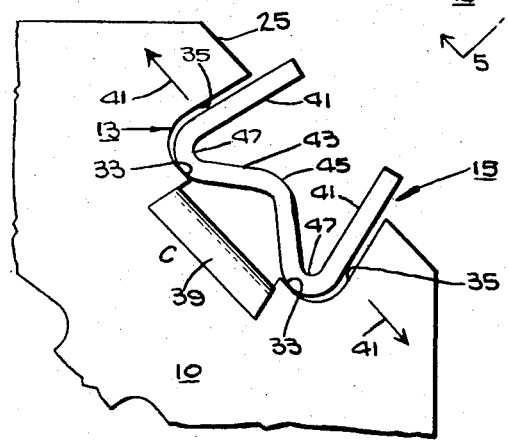
FIG. 4 is an enlarged, fragmentary elevational view taken from FIG. 3.

Referring now to the drawings in general, there is shown at 1 a stationary member, such as a stator or the like, for a dynamoelectric machine 3 having at least one end frame 5 (FIG. 1), and the stator is provided with a peripheral portion 7 connected between opposite end faces 9, 11 (FIG. 2). A plurality of openings, such as groove means 13, are provided in stator 1 between end faces 9, 11 thereof and adjacent peripheral portion 7 and means, such as a plurality of elongate beams 15, are mounted in the groove means for supporting engagement with end frame 5 (FIGS. 2-4). Beams 15 include means, such as a pair of opposite abutments 17, 19, respectively engaged with at least a portion of opposite end or side faces 9, 11 adjacent groove means 13 for preventing displacement of the beams generally axially thereof (FIG. 5).

More particularly and referring now to FIG. 2, stator 1 is provided with a magnetic core or body such as a plurality of magnetic laminations 21 forming a stack 23 for instance, but a stator constructed other than with the laminations is contemplated as being within the scope of the invention. Collectively, laminations 21 are provided with beveled portions or corners 25 between adjacent sides 27 thereby to define outer peripheral portion 7 of stack 23 interconnecting between end faces 9, 11 thereof. Groove means 13, are provided across corners 25 between end faces 9, 11 adjacent peripheral portion 7, and a rotatable member receiving bore 29 is generally coaxially provided through the stack intersecting with winding receiving slots 31. As shown also in FIGS. 3 and 4, groove means 13 are provided with a base wall portion 33 interposed between opposite side walls 35 which converge slightly as they extend from the base wall portion to intersect with the stack peripheral portion 7 at corners 25 thereof, and recess means, such key slots 37, are also provided in the stack between opposite end faces 9, 11 thereof intersecting with the base wall portions of the groove means. Keys 39 are disposed in slots 37 extending across stack 23 for holding engagement with laminations 21 to prevent skewing or separation thereof during stack handling, as is well known in the art, prior to the mounting of beams 15 therein.

Beams 15 are generally U-shaped in cross-section having opposite elongate sides, side portions or flanges 41 which converge slightly toward each other as they extend from a base, base portion or web 43 integrally formed therebetween; however, beams having a shape other than the generally U-shaped cross-section of beams 15 are also contemplated as being within the scope of the invention. Beam base 43 is provided with a raised portion, such as ridge 45 or the like, extending generally the length of beams 15, and opposite troughs, such as rounded or beveled portions 47, are integrally formed generally adjacent the intersections or junctures of beam sides 41 with the beam base. Beams 15 and groove means 13 are provided with generally complementary cross-sectional configurations, and when the beam inserted into the groove means, beam sides 41 generally confront groove side walls 35 with portions of beam base 43 engaging groove base wall 33. Key 39 in its slot 37 is spaced from groove base wall 33 and beam base 43.

Figure 5:
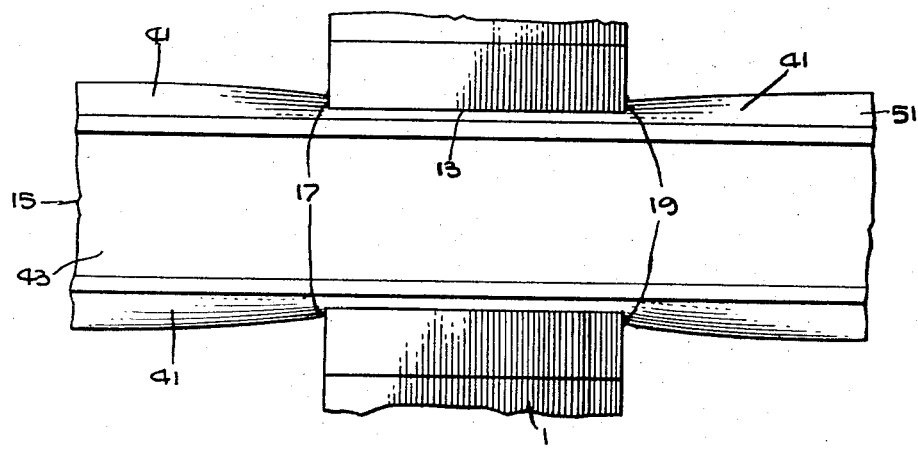
FIG. 5 is an enlarged fragmentary view taken along line 5—5 of FIG. 3.

As best seen in FIGS. 5 and 6, base 43 of beams 15 are deformed or flattened by suitable means such as staking, toggling or pressing or the like, as well known in the art (not shown), and as ridge 45 of the beam base is flattened, troughs 47 are urged or move generally in the plane of the beam base in the direction of the arrows in FIG. 4 and 6 into engagement with groove side walls 35 generally assuming the configurations thereof and preventing displacement of beams 15 generally radially of groove means 13 and stator 1. The aforementioned staking of beams 15 also urges its base 43 into engagement with groove base wall 33, and the resulting fit or engagement between beams 15 and groove means 13 inhibits movement of the beams relative to the stator in the plane of the FIGURES insomuch as convergent groove side walls 35 not only inhibits tangential movement but also radially outward movement relative to the stator axis and base wall 33 inhibits radial movement toward the stator axis.

It may be noted that in addition to beams 15 being fixed with respect to stator 1 in the plane of FIGS. 3, 4 and 6, as discussed above, the beams are also fixed to the stator in a direction generally normal or perpendicular to the plane of these FIGURES. This is accomplished by not only flattening those portions of ridges 45 of beam base 43 which are generally within the confines of groove means 13, as discussed above, but also those portions of the ridges extending along the oppositely extending portions or extensions 49, 51 of beams 15 projecting outwardly from stator end faces 9, 11 adjacent their juncture with the groove means which defines a lip 53 thereof on the stator end faces. This flattening of ridges 45 on beam extensions 49, 51 is preferably simultaneously accomplished with that of ridges 45 which are within the confines of groove means 13 and may be performed by positioning the ridges of the beam extensions on a restraining means, such as a fixture or anvil or the like (not shown), and then staking or toggling the ridges thereagainst. Although beam base 43 of beam extensions 49, 51 are restrained when ridges 45 thereof are flattened, it may be noted that beam side walls 41 of the beam extensions are unrestrained; therefore, as a result, troughs 47 of the beam extensions are forced apart a slightly greater distance than troughs disposed within the confines of groove means 13, as shown in FIGS. 5 and 6, thereby to form the pair of opposite abutments 17, 19, which are engaged with at least a portion of stator end faces 9, 11 adjacent their juncture with the groove means, as previously mentioned. In this manner, opposite abutments 17, 19 on beams 15 and engaged with stator end faces 9, 11 maintain the beams against displacement axially of groove means 13 and stator 1.

Referring now to FIG. 7, an alternative construction is shown wherein another receiving means, such as groove means 61, is provided in corners 25 of stack 23 extending between opposite end faces 9, 11 thereof. Groove means 61 is provided with opposite side walls 63, 65 interconnected by a base wall 67, and opposite recess means, such as key slots 69 are provided in the side walls 63 of the groove means. A slot key 71 is shown positioned in slot 69 of groove side wall 63 prior to being staked, toggled or pressed therein, and another slot key 71 is shown in slot 69 of groove side wall 65 having been staked, toggled or otherwise pressed therein. Although slots 69 and cooperating keys 71 are shown in both of groove sidewalls 63, 65, the use of a key and slot in only one of the groove side walls is also contemplated. A beam (not shown) would be staked or otherwise positioned in groove means 61 against radial and axial displacement thereof in the same manner as previously discussed hereinabove with respect to bemas 15 and groove means 13. From the foregoing, it may be noted that slots 69 and keys 71 may be disposed in groove side walls 63, 65 as compared to being disposed in the groove base wall, as discussed hereinbefore with respect to slot 37 and key 39.

As shown in FIG. 8, beam 15 may also be staked or otherwise positioned in a receiving means, such as groove means 73 which has the same components as the previously described groove means 13 with the exception that slot 37 is not provided in the base wall 33 thereof. In this alternative construction, recess means, such as a slot 75, is provided across the peripheral portion 7 of stack 23 between opposite end faces 9, 11 thereof, and key 77 is staked or otherwise positioned in slot 75 for maintaining lamination 21 against skewing or end-wise displacement from each other during handling for assembly.

In the above description of examples of the present invention, generally U-shaped beams 15 have been employed for purposes of illustration, and it has also been noted that the use of beams having a cross-section other than that of the generally U-shaped beam 15 are contemplated as being within the scope of the invention. While there are many other beams having various other cross-sectional shapes, as is well known in the art, one such other beam 81 is shown for purposes of illustration in FIGS. 9–11. In FIG. 9, elongate beam 81 is provided with generally T-shaped or cross integral channel sections or portions 83, 85, and channel section 83 has opposite sides or scale portions 87 interconnected by a base or base portion 89. Channel section 83 is formed with a ridge portion 91 therein for staking or toggling purposes as discussed hereinafter. In FIG. 10, beam receiving means, such as groove means 93, is provided in corners 25 of stack 23 extending across peripheral portion 7 thereof between opposite end faces 9, 11, and groove means 93 is provided with a base wall 95 interposed between opposite side walls 97. Beam 81 is positioned in groove means 93 with the beam base and side portions 87, 89 respectively confronting the groove base wall and side walls 95, 97, and thereafter, the beam is staked, toggled or otherwise pressed into fixed position in engagement with the groove means 93 in the same manner as previously described having oppositely extending portions or extensions 99, 101 of beam 81 supported by restraining means, such as a fixture or anvil or the like. When ridge portion 91 of beam channel section 83 is generally flattened by the staking operation, beam sides 87, which are disposed within the confines of groove means 93, are urged or moved generally on the plane of groove base wall 95 into engagement with groove side walls 97 generally assuming the configurations thereof for preventing displacement of beams 81 generally radially of groove means 93 and stator 1. Substantially at the same time, the ridge portion 91 of the beam extensions 99, 101 are also staked or otherwise pressed downwardly against their restraining means (not shown), and although base portion 91 of beam extensions 99, 101 are restrained or supported when the ridge portion is flattened, it may be noted that side walls 87 of the beam extensions are unrestrained. As a result, side walls 87 of beam extensions 99, 101 are forced apart a slightly greater distance than the side walls of beam 81 disposed within the confines of groove means 93, as shown in FIGS. 10 and 11, thereby to form displacement preventing means, such as a pair of opposed abutments 103, 105, which are respectively engaged with at least a portion of stator end faces 9, 11 adjacent their juncture with the groove means. In this manner, opposite abutments 103, 105 on beams 81 and engaged with stator opposite end faces 9, 11 maintain the beams against displacement axially of groove means 93 and stator 1.

In view of the foregoing, it is now apparent that a novel stationary member 1 for a dynamoelectric machine 3 is provided meeting all of the objects and advantageous features set forth hereinabove, as well as others, and that changes in the particular arrangements; shapes and details of the constructions set forth herein to illustrate preferred embodiments of the invention may be made by those skilled in the art without departing from the spirit and scope of the invention, as set out in the claims which follow.

What I claim as new and desire to secure by Letters Patent of the United States is:

1. A dynamoelectric machine stator comprising a core including a plurality of apertured magnetic laminations arranged in juxtaposed relation to form a stack having two side faces and a rotor receiving bore, and a plurality of grooves communicating between said two side faces across the outer periphery of said stack with each of said grooves having a bottom wall with a recess therein and two confronting side walls; a plurality of beams having a mounted portion thereof rigidly mounted in said plurality of grooves with each of said beam mounted portions having an elongated web portion in abutment with at least a portion of one of said groove bottom walls and two elongated flange portions projecting from said web portion in abutment with said two groove side walls; a plurality of U-shaped stack keys mounted within said recesses in juxtaposition with said beam web portions astride said stack; and two end shields secured to said plurality of beams.

2. A dynamoelectric machine stator comprising a magnetic core having a plurality of grooves in the peripheral surface thereof with each of said grooves having a bottom wall and two side walls; and a plurality of elongated rigid beams having a mounted portion thereof rigidly mounted in said plurality of grooves with each of said beam mounted portions having a web portion in abutment with one of said groove bottom walls and two spaced flange portions extending at acute angles from said web portion in abutment with said groove side walls; wherein each of said grooves has two groove lips from which rigid protruding portions of each of said rigid beams protrude from said mounted portions of said beams mounted within said grooves; wherein the width of said web portion of said rigid protruding beam portions adjacent said groove lips is greater than the width of said web portion of said mounted beam portions adjacent said groove lips whereby longitudinal movement of said elongated beams with respect to said core is inhibited; and wherein said dynamoelectric machine further comprises two bearing supporting end shields mounted to said protruding portions of said plurality of rigid beams.

3. A stator for a dynamoelectric machine having at least one end frame comprising a stack of laminations having opposite end faces, a plurality of openings in the stack between the end faces thereof, means in at least some of the openings for holding the laminations generally in their stacked positions, and means mounted in the openings for supporting engagement with the one end frame including means urged into engagement with the stack within the openings for preventing displacement of the supporting means generally radially of the openings, and other means respectively engaged with at least a portion of the opposite end faces about the openings for preventing displacement of the supporting means generally axially of the openings.

4. A stator as set forth in claim 3, wherein the supporting means further include means spaced from at least one of the opposite end faces in a direction generally axially with respect to the stack for connection with the one end frame.

5. A stator as set forth in claim 3, wherein the supporting means is generally constituted by a plurality of elongate beams, and the beams include the first named preventing means and the other preventing means, respectively.

6. A stator as set forth in claim 5, wherein the beams include a base wall interposed between generally opposite side walls, and further comprising means in the stack between the end faces thereof and connecting with at least some of the openings adjacent the base wall of the beams for receiving the holding means therein, and the holding means being disposed in the receiving means.

7. A stator as set forth in claim 5, wherein the beams include a base wall interposed between generally opposite side walls, and further comprising means in the stack between the end faces thereof and connecting with at least some of the openings adjacent at least one of the opposite side walls of the beams therein for receiving the holding means, and the holding means being disposed in the receiving means.

8. A stator as set forth in claim 5, wherein the other preventing means comprise a pair of generally opposite means on the beams extending into overlaying relation with the opposite end faces for abutment therewith about the openings, respectively.

9. A stator as set forth in claim 8, wherein the beams include a base portion interposed between generally opposite side portions, at least a portion of the abutment means being disposed generally adjacent the juncture of the base portion with the side portions, respectively.

10. A stator as set forth in claim 5, wherein the first named preventing means comprise a pair of generally opposite means on the beams for abutment with at least some of confronting portions of the stack within the openings, respectively.

11. A stator as set forth in claim 10, wherein the beams include a base portion interposed between generally opposite side portions, and the side portions generally constituting the abutment means are urged toward engagement with the confronting portions of the stack within the openings thereby to prevent the displacement of the beams generally radially of the openings.

12. A stator as set forth in claim 3, wherein the openings respectively comprise a groove having a base wall interposed between opposite side walls which intersect with the periphery of the stack, and wherein the supporting means comprise a plurality of elongate beams mounted in the grooves, the beams including a pair of means for abutment with the opposite end faces generally adjacent the junction of the grooves therewith, and the other displacement preventing means being generally constituted by the abutment means.

13. A stator as set forth in claim 12, wherein the beams further include a pair of opposite side portions urged toward abutting engagement with the side walls of the grooves, and the first named displacement preventing means being generally constituted by the opposite side portions of the beams.

14. A stationary member for a dynamoelectric machine having at least one end frame comprising a peripheral portion connected between opposite end faces; a plurality of openings in the stationary member between the end faces thereof and intersecting the peripheral portion, and means mounted in the openings for supporting the one end frame including means respectively engaged with the opposite end faces adjacent the openings for preventing displacement of the supporting means generally axially thereof, and other means engaged with the stationary member within the openings for preventing displacement of the supporting means generally radially thereof.

15. A stationary member as set forth in claim 14, wherein the other displacement preventing means comprise a pair of generally opposite means on the supporting means for abutment with at least some confronting portions of the stationary member within the openings, respectively.

16. A stationary member as set forth in claim 15, wherein the supporting means comprise a plurality of elongate beams having a base portion interposed between generally opposite side portions, and the side portions generally constituting the abutment means.

17. A stationary member as set forth in claim 15, wherein the openings respectively comprise a groove having a base wall interposed between opposite side walls which intersect with the peripheral portion of the stationary member, the supporting means being engaged with at least portions of the base wall and the side walls.

18. A stationary member as set forth in claim 17, wherein the supporting means comprises a plurality of elongate beams having a base portion interposed between a pair of opposite side portions, a pair of means on the beams for abutment with the opposite end faces generally adjacent the juncture of the groove therewith, and the abutment means generally constituting the first named displacement preventing means.

19. A stationary member as set forth in claim 18, wherein at least a portion of the abutment means being disposed generally adjacent the juncture of the base portion with the side portions, respectively.

20. A stationary member as set forth in claim 18, wherein the side portions of the beams are urged toward engagement with the side walls of the groove thereby to prevent the displacement of the beams generally radially of the groove.

21. A stationary member as set forth in claim 14, wherein the first named displacement preventing means comprises a pair of abutments.

22. A stationary member as set forth in claim 14, wherein the supporting means comprise a plurality of elongate beams, and a pair of abutments on the beams constituting the first named displacement preventing means.

23. A stationary member as set forth in claim 22, wherein the beams comprise a base portion interposed between generally opposite side portions, and at least a portion of the abutments being disposed generally adjacent the juncture of the base portion with the side portions, respectively.

* * * * *